United States Patent
Baek

(10) Patent No.: US 9,067,602 B2
(45) Date of Patent: Jun. 30, 2015

(54) TECHNIQUE FOR PROVIDING MEASURED AERODYNAMIC FORCE INFORMATION TO IMPROVE MILEAGE AND DRIVING STABILITY FOR VEHICLE

(75) Inventor: Seung Jin Baek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 828 days.

(21) Appl. No.: 13/323,368

(22) Filed: Dec. 12, 2011

(65) Prior Publication Data

US 2013/0080018 A1    Mar. 28, 2013

(30) Foreign Application Priority Data

Sep. 28, 2011    (KR) .................. 10-2011-0097959

(51) Int. Cl.
| | | |
|---|---|---|
| *B60W 30/16* | (2012.01) | |
| *G01L 15/00* | (2006.01) | |
| *B60W 40/10* | (2012.01) | |

(52) U.S. Cl.
CPC ............ *B60W 30/16* (2013.01); *B60K 2310/26* (2013.01); *B60W 2550/308* (2013.01); *B60W 2530/16* (2013.01); *G01L 15/00* (2013.01); *B60W 40/1005* (2013.01); *B60W 2750/308* (2013.01); *Y02T 10/52* (2013.01)

(58) Field of Classification Search
USPC .......................................................... 701/96
See application file for complete search history.

(56) References Cited

U.S. PATENT DOCUMENTS

| | | | | |
|---|---|---|---|---|
| 3,415,566 | A * | 12/1968 | Kerrigan ..................... | 296/180.4 |
| 7,565,233 | B2 * | 7/2009 | Logdberg ......................... | 701/70 |
| 2002/0069010 | A1 * | 6/2002 | Nishira et al. .................. | 701/96 |
| 2006/0232102 | A1 * | 10/2006 | Steel .......................... | 296/180.1 |
| 2006/0247839 | A1 * | 11/2006 | Logdberg ........................ | 701/96 |
| 2007/0013209 | A1 * | 1/2007 | Neuburger et al. ........ | 296/180.4 |

FOREIGN PATENT DOCUMENTS

| | | |
|---|---|---|
| JP | H07-232534 A | 9/1995 |
| JP | 2004-314849 A | 11/2004 |
| JP | 2009-220616 A | 10/2009 |
| KR | 1995-0019679 A | 7/1995 |
| KR | 10-2006-0050213 A | 5/2006 |
| KR | 10-2007-0111214 A | 11/2007 |
| KR | 20-2007-0111214 A | 11/2007 |
| KR | 10-2010-0116897 A | 11/2010 |

* cited by examiner

*Primary Examiner* — Shelley Chen
(74) *Attorney, Agent, or Firm* — Mintz Levin Cohn Ferris Glovsky and Popeo, P.C.; Peter F. Corless

(57) ABSTRACT

Disclosed is a technique for providing aerodynamic force information to improve gas mileage and driving stability of a vehicle. In particular, a plurality of pressure sensors are provided in a vehicle body and are configured to sense the pressure of air received from each of several points of the vehicle when the vehicle is driven. A first unit then calculates an air resistance value by measuring aerodynamic force data which the vehicle receives from air based on a pressure value of air sensed by the pressure sensor and driving information depending on the driving of the vehicle, and a method thereof.

14 Claims, 5 Drawing Sheets

PRIOR ART

TECHNIQUE FOR PROVIDING MEASURED AERODYNAMIC FORCE INFORMATION TO IMPROVE MILEAGE AND DRIVING STABILITY FOR VEHICLE

CROSS-REFERENCE TO RELATED APPLICATION

This application claims under 35 U.S.C. §119(a) the benefit of Korean Patent Application No. 10-2011-0097959 filed on Sep. 28, 2011, the entire contents of which are incorporated herein by reference.

BACKGROUND (a) Technical Field

The present invention relates to a technique for improving a mileage through estimation of aerodynamic force on a vehicle to improve the mileage by adjusting the aerodynamic force received when the vehicle is being operated and adjusting the distance between the vehicle and a vehicle traveling in the front thereof. The illustrative embodiment of the present invention also improves driver convenience and driving stability by providing aerodynamic force information to a vehicle control device and a driver.

(b) Background Art

In recent years, oil prices have begun to rise and therefore have affected the marketability of certain vehicles in the eyes of consumers. Therefore, a vehicles associated gas mileage is one of the primary vehicle selection criteria for consumers when selecting a vehicle, in addition to design and performance. The mileage of a vehicle is a ratio of a driving distance per unit fuel of the vehicle. If the vehicle has a higher gas mileage, the vehicle can travel a longer distance with less fuel.

Therefore, companies that manufacture vehicles are exerting steady effort in technological development for improving the gas mileage of their vehicles. In fact consumers have become so concerned about gas mileage that some consumers have also improved their gas mileage by modifying driving habits and reducing the weight of the vehicle.

Wind velocity and direction, and the resulting resistance have a large influence on riding and handling (R&H) safety as well as the on the vehicle's associated gas mileage. However, there is currently no system that provides aerodynamic information applied to a vehicle body.

FIG. 1 is a schematic structural diagram showing a vehicle environment control system.

Referring to FIG. 1, the vehicle environment control system includes a road environmental measuring unit 1 that measures road environment data associated with insolation, the direction of the wind, a wind velocity, temperature, humidity, noise, and atmospheric pollution of a road and transmits the measured road environment data to a remote device/server in real time through various known wireless methods. A central server unit 2 receives the measured road environment data from the road environment measuring unit 1, converts and processes the corresponding data, and transmits the converted and processed data to individual vehicles. Furthermore, a vehicle environmental control unit 3 that is installed in each of the individual vehicles and is configured to control the intensity of illumination, sound, degree of air purification, and temperature/humidity in the vehicle based on the received road environmental data received from the central server unit 2 in real time.

However, system described above controls an environment in the vehicle which travels on a road by measuring environmental data around the road and is not associated with measurement of aerodynamic force on the outside the vehicle body depending on the travelling of the vehicle. Furthermore, the above described systems does not take actions in response to the environmental data received that actually improves the gas mileage and the driving stability of the vehicle based on aerodynamic force data which is received.

SUMMARY OF THE INVENTION

The present invention has been made in an effort to provide a technique configured to improve gas mileage through estimation of aerodynamic force of a vehicle and adjusting the aerodynamic force received when the vehicle is operated and the distance between the vehicle and another vehicle traveling in front thereof.

Further, the present invention has been made in an effort to provide a technique that improves gas mileage through estimation of an aerodynamic force applied to a vehicle to improve driver convenience and driving stability by providing information on wind velocity and the direction of the wind in an outdoor area to a remote server and the driver.

In one aspect, the present invention provides a system for providing aerodynamic information, including: a plurality of pressure sensors that are provided in a vehicle body. The plurality of pressure sensors are configured to sense the pressure of air received from each of several points on the vehicle when the vehicle is driven. An aerodynamic force measuring unit is configured to calculate an air resistance value by measuring aerodynamic force data which the vehicle receives based on a pressure value sensed by the pressure sensor and driving information associated with the current driving characteristics of the vehicle.

Preferably, the system may further include: a vehicle distance measuring unit that measures a distance between the vehicle and a second vehicle that is traveling in the vicinity of the vehicle. A calculation unit is then configured to calculate an optimal intervehicle distance at which the air resistance value is minimized based on the aerodynamic force data measured by the aerodynamic force measuring unit and an intervehicle distance from a preceding vehicle. This aerodynamic force data measured by the aerodynamic force measuring unit may be provided to a vehicle dynamic control (VDC) and a vehicle stability management (VSM) system.

The plurality of pressure sensors may be installed to sense a pressure value from each of front surfaces, both sides, and the top and the bottom of the vehicle. The aerodynamic force measuring unit may sense the pressures in the pressure sensors installed in the front and rear surfaces of the vehicle body and measure a drag force which the vehicle receives through a difference between the sensed pressure values.

The aerodynamic force measuring unit may also sense the pressures in the pressure sensors installed in both sides of the vehicle body and measure a lateral force which the vehicle receives through a difference between the sensed pressure values. Furthermore, the aerodynamic force measuring unit may sense the pressures in the pressure sensors installed in the top and the bottom of the vehicle body and a measure lift force which the vehicle receives through a difference between the sensed pressure values.

The calculation unit may calculate an optimal intervehicle distance again based on aerodynamic force data which the vehicle receives and an intervehicle distance from the preceding vehicle when the preceding/second vehicle is changed or the intervehicle distance from the preceding vehicle is changed. Furthermore, a predetermined intervehicle safety distance from the preceding vehicle may be stored in a memory and used to judge whether the intervehicle distance can be decreased safely or instead should be increased.

In the calculation unit, when the intervehicle distance can be decreased, by controlling the intervehicle distance to decrease, the intervehicle distance may be controlled to further decrease when the air resistance value decreases, and the distance-controlled intervehicle distance and the air resistance value may be stored when the air resistance value does not decrease.

Additionally, when the intervehicle distance cannot be decreased, by controlling the intervehicle distance to increase, the intervehicle distance may be controlled to increase when the air resistance value decreases, and the distance-controlled intervehicle distance and the air resistance value may be stored when the air resistance value does not decrease.

In another aspect, the present invention provides a system for providing aerodynamic information to improve gas mileage and driving stability of a vehicle, including a controller that senses the pressure of air which the vehicle body receives by using a plurality of pressure sensors provided in/on a vehicle body and measures the aerodynamic force data which the vehicle receives through the sensed pressure values and the driving information associated with the vehicle when the vehicle is being driven. Furthermore, the controller calculates the optimal intervehicle distance at which the air resistance value is minimized based on the aerodynamic force data and the intervehicle distance from the preceding vehicle by measuring the intervehicle distances from other vehicles.

In yet another aspect, the present invention provides a method for providing aerodynamic information to improve gas mileage and driving stability of a vehicle, including: measuring pressure which a vehicle body receives while a vehicle is driven by a plurality of pressure sensors installed in the vehicle body; analyzing aerodynamic force data which the vehicle receives from air based on pressure values of air sensed by the pressure sensors and driving information depending on the driving of the vehicle; measuring distances from other vehicles which are travelling around a vehicle; and calculating an optimal intervehicle distance at which an air resistance value is minimized based on an intervehicle distance from a preceding vehicle.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
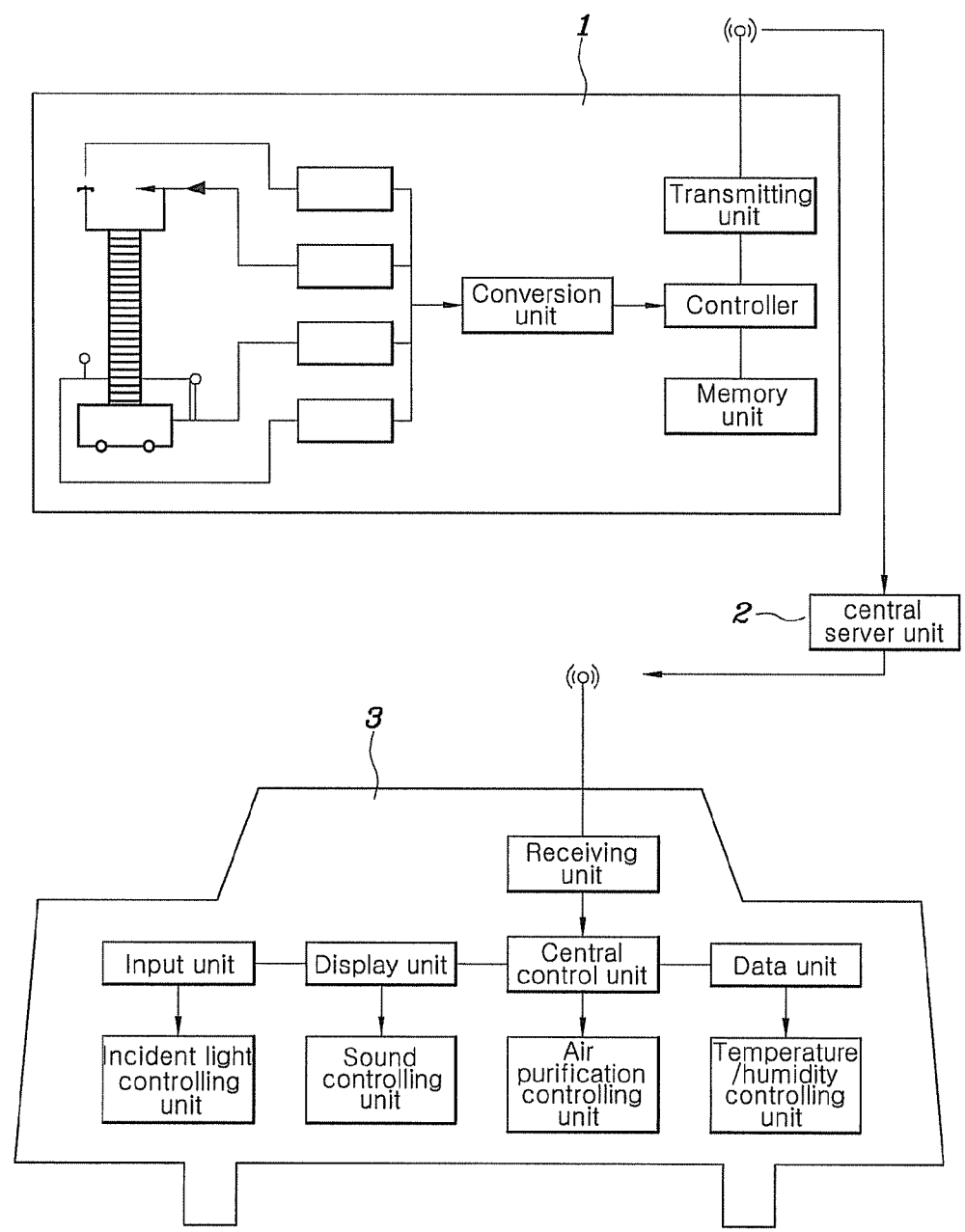
FIG. 1 is a schematic structural diagram showing a vehicle environment controlling system in prior art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, it is understood that the term "technique" as used herein is inclusive of associated systems, methods, apparatuses, computer readable medium and any other device or plurality of devices which embody the invention described below.

Exemplary embodiments of the present invention will hereinafter be described in detail with reference to the accompanying drawings.

Figure 2:
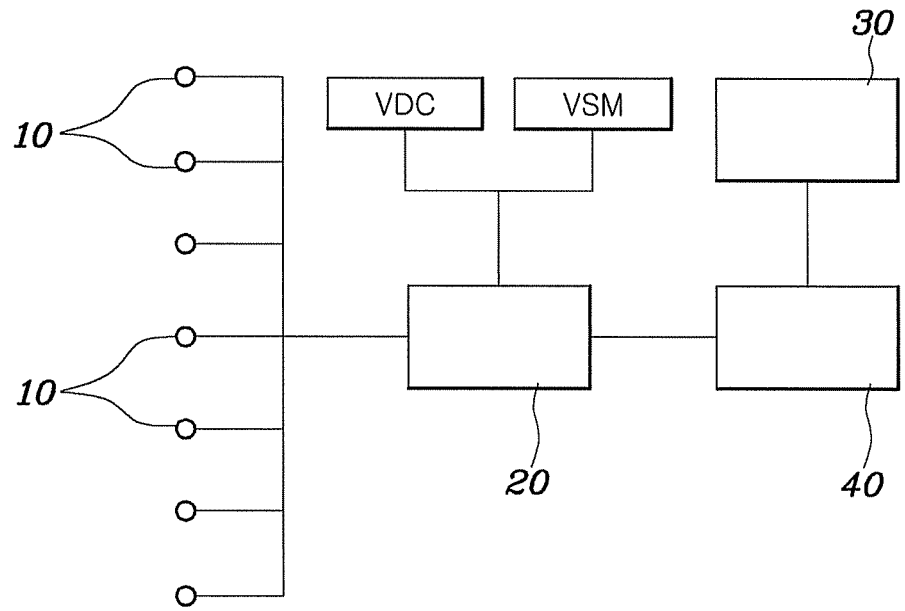
FIG. 2 shows a structure of a system for providing aerodynamic information according to an exemplary embodiment of the present invention.

FIGS. 2 to 7 show a system and a method for providing aerodynamic force information to improve gas mileage and driving stability of a vehicle. FIG. 2 is a system for providing aerodynamic information according to an exemplary embodiment of the present invention, which includes a plurality of pressure sensors 10 that are provided in a vehicle body and that are configured to sense the pressure from air received at each of several points on the vehicle when the vehicle is driven. The system also includes an aerodynamic force measuring unit 20 that is configured to calculate an air resistance value by measuring aerodynamic force data which the vehicle receives from air based on a pressure value sensed by the pressure sensor 10 and driving information associated with the way a vehicle is currently being driven.

That is, the system senses pressure from air received on the outer surfaces of the vehicle body through the plurality of pressure sensors 10 installed on the outside of the vehicle body. The system then measures the aerodynamic force data which the vehicle body receives by gathering the sensed pressure values and driving information. The driving information may include information regarding the vehicle's velocity, stability, and the like.

In addition, the aerodynamic force data may be converted into and calculated as information such as wind direction, wind velocity, air volume, air resistance, and the like to be digitized and displayed in a room mirror, a center fascia, a cluster, and the like as a value. Accordingly, driving convenience can be improved through the information provided to a driver, and the gas mileage and the driving stability can be improved by controlling the velocity and direction of the vehicle therefrom.

Figure 4:
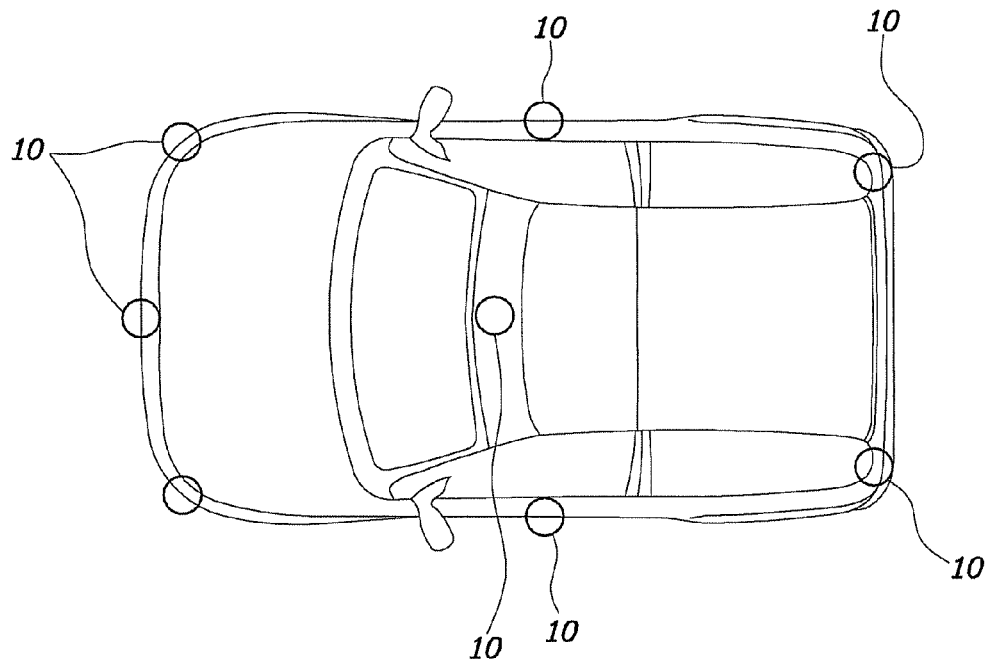
FIG. 4 is a schematic plan view of a state in which a pressure sensor is installed in a vehicle according to an exemplary embodiment of the present invention.

As shown in FIG. 4, the pressure sensor 10 may be installed to sense a pressure values from each of rear and front surfaces, side surfaces, and top and bottom surfaces of the vehicle. That is, by installing the pressure sensor 10 in each of the front and rear surfaces, side surfaces, and top and bottom surfaces of the vehicle, the wind pressure received from various directions of the vehicle body can be effectively and accurately sensed. That is, the plurality of pressure sensors 10 may be installed on each surface in order to improve the accuracy of the sensed pressure values.

Figure 5:
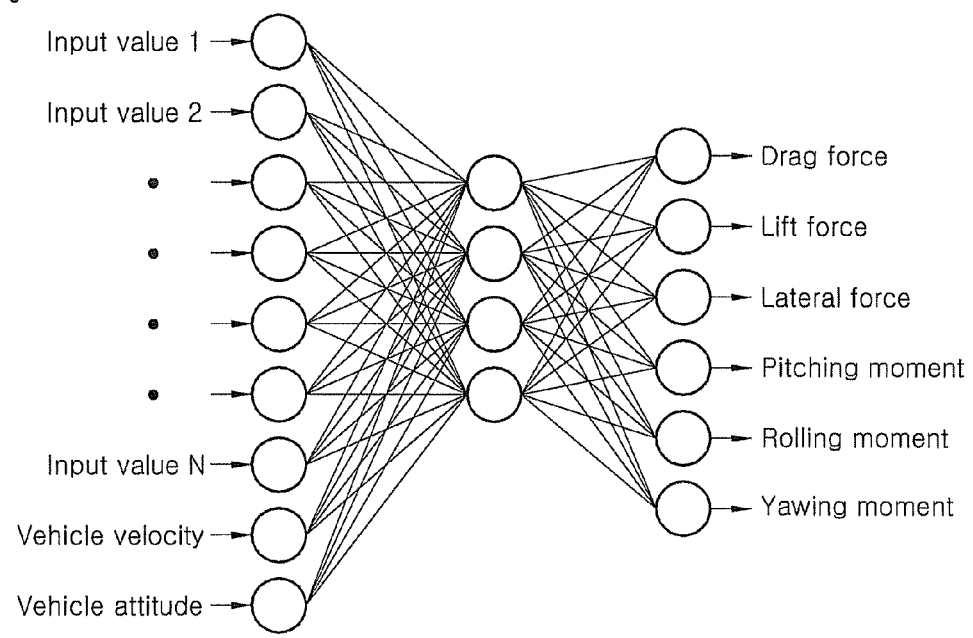
FIG. 5 is a structural diagram of a neural network circuit in an aerodynamic force measuring unit according to an exemplary embodiment of the present invention.

Moreover, as shown in FIG. 5, the aerodynamic force may be measured and estimated in the aerodynamic force measuring unit 20 through a neural network method. That is, the pressure sensor 10 includes input nodes configured to correspond to the pressure values sensed by the respective pressure sensors 10 and input variables such as the vehicle velocity and the vehicle stability, hidden nodes that process a linear combination of the input variable values transferred from the input nodes as a nonlinear function and transfer the processed linear combination to output nodes or other hidden layers, and output nodes that output the aerodynamic force data by connection weights among the nodes.

Herein, the number of the hidden layers, the number of the nodes, coefficient values among the nodes, and the like are determined as a wind tunnel test/computation analysis value when the vehicle is developed to be inputted into the aerodynamic measuring unit 20 and the aerodynamic force data outputted from the output nodes may be aerodynamic 6-component force values.

Moreover, the drag force which the vehicle receives is measured through a difference in pressure values sensed by the aerodynamic force measuring unit 20 when the pressure sensors 10 installed on the front and rear surfaces of the vehicle body sense the pressures. In addition, the lateral force which the vehicle receives is measured through the difference in pressure values sensed by the aerodynamic force measuring unit 20 when the pressure sensors 10 installed on the side surfaces of the vehicle body sense pressure. Finally, the lift force which the vehicle receives is measured through the difference in pressure values sensed by the aerodynamic force measuring unit 20 when the pressure sensors 10 installed on the top and bottom surfaces of the vehicle body sense pressure.

That is, a pitching moment, a rolling moment, and a yawing moment are measured together in addition to a drag force, a lateral force, and a lift force that are measured as above to be operated complexly and integrally, such that an aerodynamic value which the vehicle body receives can be measured accurately and effectively.

The system for providing measured aerodynamic force information according to the exemplary embodiment of the present invention may further include a vehicle distance measuring unit 30 that is configured to measure a distance between the vehicle in which the unit 30 is installed and other vehicles that are travelling around the vehicle and a calculation unit 40 that is configured to calculate an optimal intervehicle distance at which the air resistance value is minimized based on the aerodynamic force data measured by the aerodynamic force measuring unit 20 and an intervehicle distance from a preceding/second vehicle travelling in front of the vehicle in which the system is installed.

That is, as the air resistance value varies depending on the intervehicle distance from the preceding vehicle, the optimal intervehicle distance is calculated e.g., at which the air resistance value is minimized by decreasing or increasing the intervehicle distance from the preceding vehicle by controlling the velocity of the vehicle. Accordingly, an air resistance reduction effect increases while driving within the optimal intervehicle distance to improve the gas mileage of the vehicle.

Herein, the vehicle distance measuring unit 30 which measures the distances from other vehicles around the vehicle in which it is installed includes a distance measuring sensor which may be embodied as, e.g., a laser sensor. Furthermore, the intervehicle distance may be displayed on a dashboard, and the like.

In addition, the calculation unit 40 is configured to repeatedly calculate the optimal intervehicle distance based on the aerodynamic force data which the vehicle receives and the intervehicle distance from the preceding distance when a condition of the preceding vehicle is changed. That is, when the intervehicle distance from the preceding vehicle is changed due to a change in the velocity of the vehicle in which the system is installed or of the preceding vehicle, or when the type and shape of the preceding vehicle are changed due to interruption, the air resistance value is changed. Therefore, the optimal intervehicle distance is again calculated and the adjusted by controlling the distance of the vehicle in which the present system is installed from the preceding vehicle in real time in order to improve gas mileage.

In other words, in general, as the intervehicle distance decreases, the air resistance reduction effect increases, but the optimal intervehicle distance varies depending on the shape and type of the preceding vehicle in all by exceptional circumstances. Therefore, the optimal distance should be calculated and maintained so as to minimize the air resistance value according to the driving condition and the conditions/characteristics (e.g., speed, shape, etc.) of the preceding vehicle.

Moreover, the calculation unit 40 may store a predetermined safety intervehicle distance from the preceding vehicle and judge whether the intervehicle distance can be reduced depending on this safety distance. Furthermore, since the maximum and minimum velocities which the vehicle can be driven may be changed depending on the driving velocity of the vehicle and the road conditions on which the vehicle is travelling, the intervehicle safety distance from the preceding vehicle may vary depending on the corresponding road conditions. That is, the intervehicle safety distance on an expressway may be at least greater than that on a general country road.

For example, when the intervehicle safety distance is set to 6 m, the intervehicle distance decreases when the distance from the preceding vehicle is equal to or more 6 m and the vehicle is prevented from further decreasing its intervehicle distance to less than 6 m.

Herein, in the calculation unit 40, when the intervehicle distance is able be further decreased without exceeding safety limitations, the vehicle is controlled to further decrease its intervehicle distance when the air resistance value decreases. When, however, the air resistance value does not decrease, the distance-controlled intervehicle distance and the air resistance value are stored in a memory or storage device for future reference.

Conversely, in the calculation unit 40, when the intervehicle distance cannot be decreased, by controlling the intervehicle distance to increase, the intervehicle distance is controlled to increase when the air resistance value decreases and the distance-controlled intervehicle distance and the air resistance value are stored when the air resistance value does not decrease. That is, the optimal intervehicle distance at which the air resistance value is minimized while decreasing or increasing the intervehicle distance is calculated by judging whether the intervehicle distance can be decrease to improve the gas mileage within a certain driving environment while at the same achieving a certain degree of safety.

Figure 3:
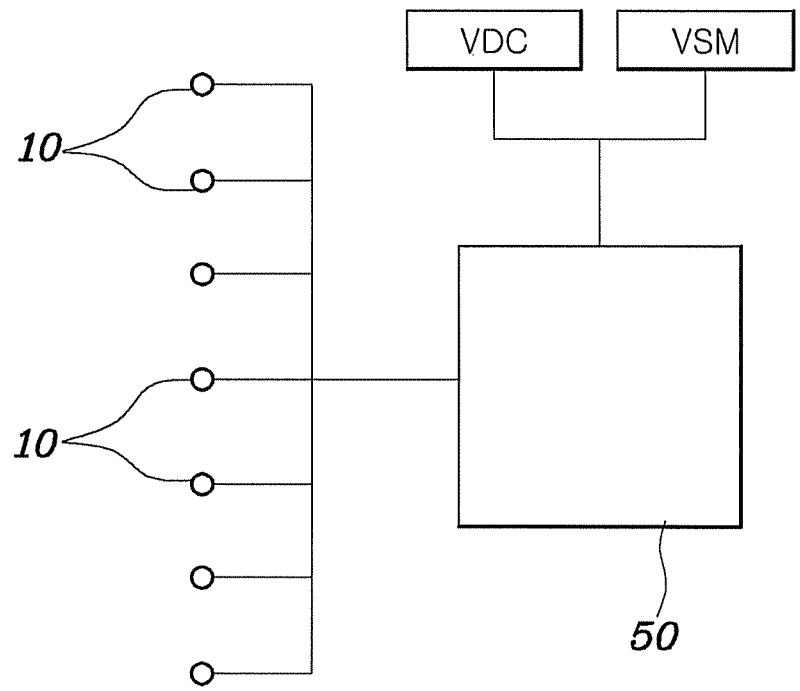
FIG. 3 shows a structure of a system for providing aerodynamic information according to another exemplary embodiment of the present invention.

Meanwhile, as shown in FIG. 3, the system may include a controller that senses the pressure from air which the vehicle body receives by using the plurality of pressure sensors 10 provided in the vehicle body and measures the aerodynamic force data which the vehicle receives through the sensed pressure value and the driving information when the vehicle is driven. The controller then calculates the optimal intervehicle distance at which the air resistance value is minimized based on the aerodynamic force data and the intervehicle distance from the preceding vehicle by measuring the intervehicle distances from other vehicles. That is, as shown in FIG. 2, the system for providing aerodynamic force information according to the exemplary embodiment of the present invention may include an aerodynamic force measuring unit 20, a vehicle distance measuring unit 30, and a calculation unit 40 and may be constituted by a controller 50 in which the components are integrated and controlled in one module.

In addition, as shown in FIGS. 2 and 3, according to the exemplary embodiment of the present invention, the aerodynamic force data measured by the aerodynamic force measuring unit 20 can be provided to a vehicle dynamic control (VDC) and a vehicle stability management (VSM) system, e.g., a chassis system control. More specifically, a change of a wheel-load under a cross-wind condition based on aerodynamic force data may be applied to an outer part of the vehicle body to stabilize the vehicle body. Additionally, pushing or steering may be minimized by aerodynamic force to improve the driving stability.

Figure 6:
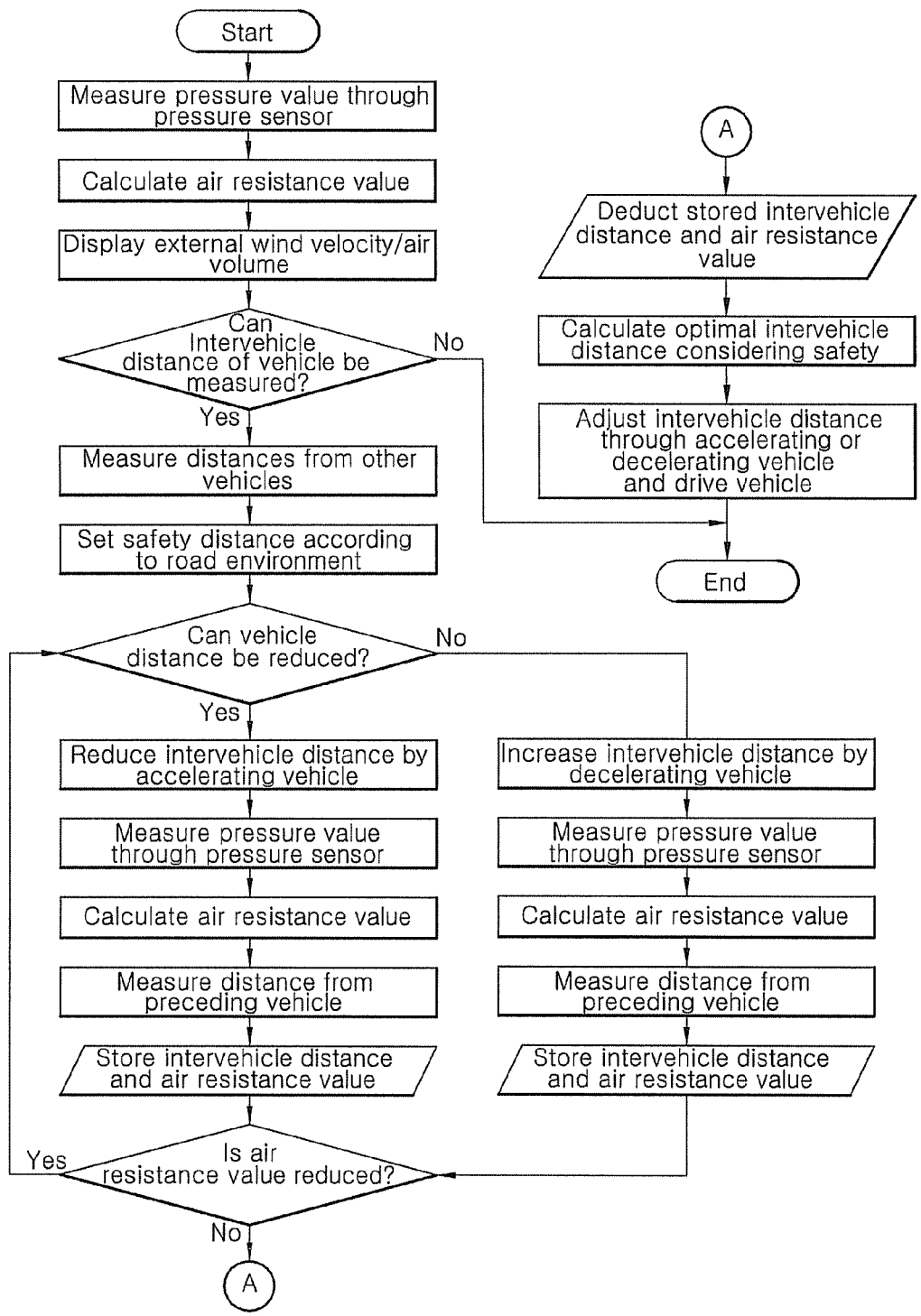
FIG. 6 is a flowchart of a method for providing aerodynamic force information according to an exemplary embodiment of the present invention.

Meanwhile, a method for providing aerodynamic force information to improve a mileage and driving stability of a vehicle according to an exemplary embodiment of the present invention will be described with reference to FIG. 6. The method for providing aerodynamic force information according to the exemplary embodiment of the present invention includes a pressure measuring operation of measuring pressure which a vehicle body receives while a vehicle is driven through a plurality of pressure sensors 10 installed in the vehicle body, an aerodynamic force measuring operation of measuring aerodynamic force data which the vehicle receives from air based on pressure values of air sensed by the pressure sensors 10 and driving information depending on the driving of the vehicle, a vehicle distance measuring operation of measuring distances from other vehicles which travels around a self-vehicle, and an optimal intervehicle distance calculating operation of calculating an optimal intervehicle distance at which an air resistance value is minimized based on an intervehicle distance from a preceding vehicle. That is, when pressure is sensed by the pressure sensors 10, the aerodynamic force data of air which the vehicle receives from the vehicle's associated driving characteristics in addition to the sensed pressure values and the aerodynamic force data are operated complexly and integrally to calculate the air resistance value.

Herein, the calculated air resistance value and the driving information of the vehicle may be displayed in an interior compartment of the vehicle so that the driver can verify the calculated air resistance value and the driving information associated with the vehicle.

Subsequently, when the intervehicle distance can be measured, by judging whether a device for measuring the intervehicle distances from other vehicles, the distances from other vehicles which travel around the vehicle in which the system is installed can be effectively measured. Additionally, by displaying the aerodynamic information for the driver, the driver can also manually adjust the intervehicle distance or other driving characteristics to manually control the air resistance.

In addition, when the distances from other vehicles are measured, a safety distance from the preceding vehicle on a road which the vehicle is travelling is set and thereafter, the controller determines whether the distance from the preceding vehicle should be decreases according to the set safety distance.

According to the judgment result, when the intervehicle distance may be decreased, the distance from the preceding vehicle is decreased by vehicular acceleration and thereafter, the air resistance value is calculated again based on pressure values sensed by the pressure sensors 10 and the aerodynamic force data and the distance from the preceding vehicle is measured to be stored.

Subsequently, the controller judges whether the air resistance value is decreasing and the intervehicle distance is controlled to further decrease when the air resistance value should be decreased to increase gas mileage and the intervehicle distance, which is distance-controlled and stored and the air resistance value are deducted when the air resistance value does not decrease.

On the contrary, when the intervehicle distance from the preceding vehicle cannot be decreased due to, e.g., safety concerns or obstacles, the distance is increased by decelerating the vehicle and thereafter, the air resistance value is calculated again based on the pressure values sensed by the pressure sensors 10 and the aerodynamic force data and the distance from the preceding vehicle is measured to be stored.

Subsequently, the controller determines whether the air resistance value is decreasing and the intervehicle distance is controlled to further increase when the air resistance value decreases and the intervehicle distance which is distance-controlled and stored and the air resistance value are deducted when the air resistance value does not decrease.

In addition, the optimal intervehicle distance at which the air resistance value is minimized and stored is calculated and thereafter, the vehicle is driven according to the optimal intervehicle distance by accelerating and decelerating the vehicle to thereby improve the gas mileage and significantly improve the driving stability of the vehicle.

Figure 7:
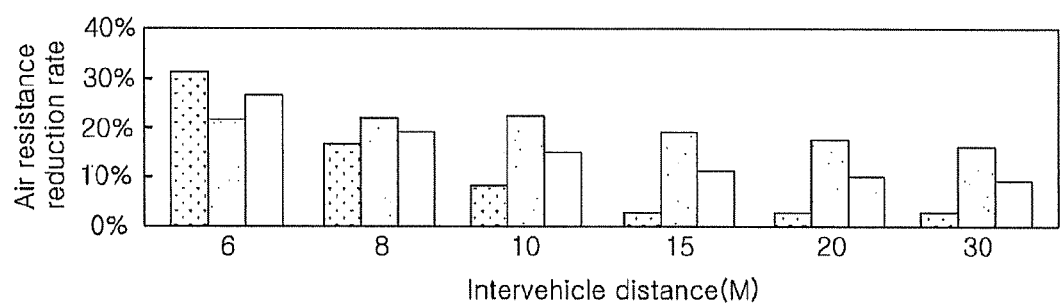
FIG. 7 is a graph of an experimental result showing an air resistance reduction rate for each distance between vehicles according to an exemplary embodiment of the present invention.

FIG. 7 shows air resistance reduction rate for each distance between vehicles by using the system for providing aerodynamic force information according to an exemplary embodiment of the present invention wherein semi-midsize vehicles are used as an example. That is, generally, as the intervehicle distance decreases, an air resistance affect increases. The air resistance reduction rate is a maximum of 31% in the preceding vehicle, a maximum of 22% in the vehicle following the preceding vehicle, and a maximum of 26% on the whole.

According to exemplary embodiments of the present invention, the pressure of air which a vehicle body receives is sensed through a plurality of pressure sensors installed outside the vehicle body following the preceding vehicle and information including the direction of the wind, a wind velocity, an air volume, an air resistance value, and the like are provided to a driver by measuring aerodynamic force data which the vehicle body receives through the sensed pressure value and driving information.

Moreover, an optimal intervehicle distance at which the air resistance value is minimized is calculated while decreasing and increasing an intervehicle distance from a preceding vehicle by controlling the velocity of the vehicle, so that an air resistance reduction effect increases when the vehicle is driven with the optimal intervehicle distance, thereby significantly improving a mileage of the vehicle. That is, when air resistance decreases by approximately 10%, the gas mileage can be improved by approximately 5%.

Further, aerodynamic force data measured by an aerodynamic force measuring unit is provided to a vehicle dynamic control (VDC) and a vehicle stability management (VSM) to maintain the stable driving characteristics of the vehicle body, Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A system for providing aerodynamic information to improve gas mileage and driving stability of a vehicle, comprising:
   a plurality of pressure sensors installed on a vehicle body and configured to sense air pressure received from each of several points on the vehicle when the vehicle is driven; and
   a first unit configured to calculate an air resistance value by measuring aerodynamic force data which the vehicle receives from air based on:
      a pressure value of air sensed by at least one of the plurality of pressure sensors, and
      driving information associated with driving characteristics of the vehicle; wherein the first unit is further configured to calculate the optimal intervehicle distance between the vehicle and a preceding vehicle at which the air resistance value is minimized based on the aerodynamic force data and by measuring the intervehicle distances from other vehicles around the vehicle.

2. The system of claim 1, further comprising:
   a unit configured to measure a distance between a self-vehicle and other vehicles that travel around the self-vehicle; and
   a calculation unit configured to calculate an optimal intervehicle distance at which the air resistance value is minimized based on the aerodynamic force data measured by the first unit and an intervehicle distance from a preceding vehicle.

3. The system of claim 1, wherein the aerodynamic force data measured by the first unit is provided to a vehicle dynamic control (VDC) and a vehicle stability management (VSM) system.

4. The system of claim 1, wherein the pressure sensor is installed to sense a pressure value from each of front and rear surfaces, both side surfaces, and a top and bottom surfaces of the vehicle.

5. The system of claim 1, wherein the first unit senses the pressures in the pressure sensors installed in the front and rear surfaces of the vehicle body and measures a drag force which the vehicle receives through a difference between the sensed pressure values.

6. The system of claim 1, wherein the first unit senses the pressure in the pressure sensors installed in both side surfaces of the vehicle body and measures a lateral force which the vehicle receives through a difference between the sensed pressure values.

7. The system of claim 1, wherein the first unit senses the pressure in the pressure sensors installed in the top and bottom surfaces of the vehicle body and measures a lift force which the vehicle receives through a difference between the sensed pressure values.

8. The system of claim 1, wherein the calculation unit repeatedly calculates an optimal intervehicle distance based on aerodynamic force data which the vehicle receives and an intervehicle distance from a preceding vehicle when the preceding vehicle changes or the intervehicle distance from the preceding vehicle is changed.

9. The system of claim 1, wherein the calculation unit stores a predetermined intervehicle safety distance from a preceding vehicle and determines whether the intervehicle distance can be decreased according to the safety distance.

10. The system claim 9, wherein in the calculation unit, when the intervehicle distance can decrease, by controlling the intervehicle distance to decrease, the intervehicle distance is controlled to further decrease when the air resistance value decreases and the distance-controlled intervehicle distance and the air resistance values are stored when the air resistance value does not decrease.

11. The system claim 9, wherein in the calculation unit, when the intervehicle distance cannot decrease, by controlling the intervehicle distance to increase, the intervehicle distance is controlled to increase when the air resistance value decreases and the distance-controlled intervehicle distance and the air resistance value are stored when the air resistance value does not decrease.

12. A system for providing aerodynamic information to improve a mileage and driving stability of a vehicle, comprising:
   a controller configured to received sensed air pressure which a vehicle body receives by using a plurality of pressure sensors provided in the vehicle body, calculate aerodynamic force data which the vehicle receives based on the sensed pressure value and driving information associated certain driving characteristics of the vehicle and calculate the optimal intervehicle distance between the vehicle and a preceding vehicle at which the air resistance value is minimized based on the aerodynamic force data and by measuring the intervehicle distances from other vehicles around the vehicle.

13. A method for providing aerodynamic information to improve a mileage and driving stability of a vehicle, comprising:
- measuring pressure which a vehicle body receives while a vehicle is driven by a plurality of pressure sensors installed in the vehicle body;
- measuring, by a controller, aerodynamic force data which the vehicle receives from air based on pressure values sensed by the pressure sensors and driving information based on the driving characteristics of the vehicle;
- measuring, by a measuring device, distances from other vehicles which are travelling around the vehicle; and
- calculating, by the controller, an optimal intervehicle distance at which an air resistance value is minimized based on an intervehicle distance from a preceding vehicle.

14. A computer readable medium containing executable program instructions executed by a processor, comprising:
- program instructions that measure pressure which a vehicle body receives while a vehicle is driven by a plurality of air pressure sensors installed in the vehicle body;
- program instructions that measure aerodynamic force data which the vehicle receives from air based on pressure values sensed by the pressure sensors and driving information based on the driving characteristics of the vehicle;
- program instructions that measure distances from other vehicles which are travelling around the vehicle; and
- program instructions that calculate an optimal intervehicle distance at which an air resistance value is minimized based on an intervehicle distance from a preceding vehicle.

* * * * *